United States Patent
Gupta et al.

(10) Patent No.: US 10,192,261 B2
(45) Date of Patent: Jan. 29, 2019

(54) SYSTEM AND METHOD FOR PERFORMING OFFLINE REVENUE ASSURANCE OF DATA USAGE

(71) Applicant: OPENET TELECOM LTD., Dublin (IE)

(72) Inventors: Monika Gupta, Alpharetta, GA (US); Niall Norton, Dublin (IE); Andrew D'Souza, Silver Spring, MD (US)

(73) Assignee: OPENET TELECOM LTD., Dublin (IE)

(*) Notice: Subject to any disclaimer, the term of this patent is extended or adjusted under 35 U.S.C. 154(b) by 1081 days.

(21) Appl. No.: 13/973,044

(22) Filed: Aug. 22, 2013

(65) Prior Publication Data

US 2014/0058908 A1  Feb. 27, 2014

Related U.S. Application Data

(60) Provisional application No. 61/692,309, filed on Aug. 23, 2012.

(51) Int. Cl.
*G06Q 40/00* (2012.01)
*G06Q 30/04* (2012.01)

(52) U.S. Cl.
CPC ............. *G06Q 40/00* (2013.01); *G06Q 30/04* (2013.01); *G06Q 40/12* (2013.12)

(58) Field of Classification Search
None
See application file for complete search history.

(56) References Cited

U.S. PATENT DOCUMENTS

| | | | | |
|---|---|---|---|---|
| 5,649,286 A | * | 7/1997 | Frerking | H04W 60/04 455/435.1 |
| 6,345,239 B1 | * | 2/2002 | Bowman-Amuah | G06Q 20/10 703/6 |
| 6,427,132 B1 | * | 7/2002 | Bowman-Amuah | G06Q 30/02 703/22 |
| 6,611,867 B1 | * | 8/2003 | Bowman-Amuah | H04L 12/2602 709/218 |
| 2007/0249321 A1 | * | 10/2007 | Kumar | H04L 12/14 455/406 |
| 2009/0063228 A1 | * | 3/2009 | Forbes, Jr. | G01D 4/004 705/7.25 |
| 2009/0147937 A1 | * | 6/2009 | Sullhan | H04M 3/42068 379/201.02 |
| 2014/0058908 A1 | * | 2/2014 | Gupta | G06Q 30/04 705/30 |

\* cited by examiner

*Primary Examiner* — Fateh M Obaid
(74) *Attorney, Agent, or Firm* — The Marbury Law Group, PLLC

(57) ABSTRACT

The system and methods of the various embodiments enable a revenue assurance system to detect revenue leakage by analyzing usage records from one or more sources within a telecommunications network. Discrepancies are identified and corrective action taken where possible. Corrective actions may include requesting source systems to retransmit missing or erroneous records that were detected. This may result in reduced revenue loss for the network operator.

20 Claims, 7 Drawing Sheets

SYSTEM AND METHOD FOR PERFORMING OFFLINE REVENUE ASSURANCE OF DATA USAGE

RELATED APPLICATIONS

This application claims the benefit of priority to U.S. Provisional Application No. 61/692,309, titled "System and Method for Performing Offline Revenue Assurance of Data Usage" filed Aug. 23, 2012, the entire contents of which are hereby incorporated by reference.

BACKGROUND

Cellular telephone and data network operators currently suffer revenue leakage from existing services and networks for a variety of reasons. Additionally, new service demands, integration of new technology and platforms, requirements for real-time processing, and dependence upon third parties for content and billing are increasing network operators' exposure to revenue leakage. Ensuring the completeness and accuracy of transactions processed, and the application of correct tariffs and policies, is now a much more complex challenge for network operators.

Revenue assurance represents both a large opportunity for network operators to maximize their reported (and billed) revenues, and an opportunity to identify and reduce unnecessary revenue leakage that can arise. Reports estimate that telecoms network operators incur average revenue per user (ARPU) losses of between 10% and 15% as a result of weak revenue assurance practices. These losses are typically related to issues with accuracy and completeness of information flowing through various systems in the revenue stream, such as provisioning, usage processing and billing. For network operators and content providers, revenue assurance also plays a large role in identifying revenue losses caused by the failure of content delivery networks or the operators' systems to deliver content to users' devices in an accurate and timely manner.

Recently enacted legal and regulatory requirements, such as the Sarbanes-Oxley Act in the United States, compel corporate officers to certify that they have established and continue to maintain internal controls for assuring the accuracy of corporate financial reports. These requirements have further driven activity in, and the importance attached to, revenue assurance outside the traditional finance, product and marketing related functions. For example, in the event of a revenue related issue emerging for a network operator, the directors can use their implementation of best in class revenue assurance systems as a defense.

Network operators' revenue models are highly complex, and this complexity continues to grow—with many users consuming different services, on different price plans, using different devices. A single user may also pay for these services in various ways, such as via a traditional post-paid invoice, on a pre-paid basis, or with some combination of the pre-paid and post-paid arrangements, depending on the specific service or content being consumed. More recently, the introduction of "sponsored data" services in which a content provider or another third-party pays for a user's consumption of a service, has added yet another layer of complexity to revenue assurance systems.

Traditionally, revenue assurance systems have had to rely on trend analysis tools and sampling and statistical validations in order to address the challenges of completeness and accuracy. However, services offered to users were not typically charged and consumed in real time—i.e., the rating and charging functions were performed post-event, usually in batch mode. The advent of prepaid services, and more recently shared monetary and non-monetary balances across multiple services, devices and users, as well as services and content that can be paid for on an ad hoc basis, have brought about a change of emphasis in the rating and charging of network usage records. To date real-time tariffs and the options available to users have been relatively simple and non-complex propositions (largely due to the technology and business models still evolving).

The growth of IP-based services has further compounded the difficulties associated with providing network operators with an adequate revenue assurance solution. IP network nodes typically generate an order of magnitude more usage records compared with usage records for circuit-switched networks. In addition, IP usage records can arrive out of sequence because they are not ordered or hierarchical; are often incomplete due to, for example, incorrectly terminated, long lasting sessions or lost packets; and are typically more complex and disparate than non-IP based usage records. For example, a mobile phone call might generate five usage records (i.e., CDRs) with the same phone number. On the other hand, an IP session may generate hundreds of URL usage records with multiple different IP addresses that need to be correlated, and which need to be related to an access point and associated with a user's mobile device. Since these relationships are typically recorded in an authentication record (e.g., an AAA record), it is often challenging to validate, aggregate, and correlate users' usage records completely and accurately in real-time for both the network operator and third-party provided services. Further, as noted above, these records may represent different content and services consumed by the user, and each service may have to be charged differently based on the defined business rules, user subscriptions, etc. For all the forgoing reasons, providing adequate revenue assurance systems in IP-based networks involves challenging design criteria that must be satisfied by network operators and system engineers.

Looking forward, two things are expected to change that will make the challenges associated with providing network operators with adequate revenue assurance systems even more pronounced. Firstly, network operators and their partners are expected to offer their users increasing quantities and varieties of services. Secondly, network operators are expected to offer their users more sophisticated real-time environments and user propositions (e.g., mobile videoconferencing, mobile TV, etc.). Many of these complex services are delivered via a plurality of network elements, each of which may have different service monitoring and usage reporting capabilities, making reconciliation of usage reports from across these elements all the more challenging. As a result, revenue leakage in real-time rating and charging functions/systems may mean real-time losses for network operators and potentially even their partners.

The challenges presented by these expected changes are further compounded by recent and anticipated legal and regulatory changes (e.g., Sarbanes-Oxley) that may require network operators to maintain more formal evidence that adequate checks and tests have been conducted by accounting and billing systems. Consequently, network operators may also be compelled to put in place adequate and sufficient systems to provide more effective, robust, and efficient revenue assurance systems and solutions.

SUMMARY

The various embodiments include methods of reducing revenue leakage within a communication network, including receiving in a processor usage records from a network component in the communication network, performing revenue assurance operations to determine whether the received usage records indicate that there are discrepancies in reports of service usage, and generating an alert message that includes information suitable for causing the network component to resend usage records associated with the discrepancies when the revenue assurance operations indicate that there are discrepancies in the reports of service usage.

In an embodiment, receiving usage records from the network component in the communication network may include receiving a first usage record from a first server associated with a shared account balance, and receiving a second usage record from a second server associated with the shared account balance, in which the first and second usage records relate to a session associated with a user of the shared account balance. In an embodiment, receiving usage records from the network component in the communication network may include receiving two or more usage records from a mediation system server. In an embodiment, receiving usage records from the network component in the communication network may include receiving a first usage record from a mediation system server and receiving a second usage record from a real-time charging system server.

In a further embodiment, performing revenue assurance operations to determine whether the received usage records indicate that there are discrepancies in reports of service usage may include performing time-gap analysis operations. In a further embodiment, performing revenue assurance operations to determine whether the received usage records indicate that there are discrepancies in reports of service usage may include performing statistical count analysis operations. In a further embodiment, performing revenue assurance operations to determine whether the received usage records indicate that there are discrepancies in reports of service usage may include performing audit trail tracking operations that include linking an identifier of one of the received usage records to an identifier of a summary record.

In a further embodiment, performing revenue assurance operations to determine whether the received usage records indicate that there are discrepancies in reports of service usage may include performing audit trail tracking operations that include linking an identifier of a child record to an identifier of its parent record. In a further embodiment, performing revenue assurance operations to determine whether the received usage records indicate that there are discrepancies in reports of service usage may include determining whether the received usage records indicate that there are missing or incomplete usage records.

In a further embodiment, receiving usage records from the network component in the communication network may include receiving a first usage record that may include information identifying service usage in a first unit of measurement, and receiving a second usage record that includes information identifying service usage in a second unit of measurement, and performing revenue assurance operations to determine whether the received usage records indicate that there are discrepancies in reports of service usage may include converting the information identifying service usage in the first unit of measurement into converted unit information, and comparing the converted unit information to the information included in the second usage record to determine whether there are discrepancies in the reports of service usage.

In a further embodiment, receiving usage records from the network component in the communication network may include receiving a first usage record that includes information identifying a first type of service usage, and receiving a second usage record that includes information identifying a second type of service usage, and performing revenue assurance operations to determine whether the received usage records indicate that there are discrepancies in reports of service usage may include determining whether the first usage record and the second usage record relate to delivery of the same service, and determining whether the first type of service usage corresponds to the second type of service usage.

In a further embodiment, generating the alert message that includes information suitable for causing the network component to resend usage records associated with the discrepancies may include generating the alert message to include information suitable for causing a first server to resend the usage records associated with the discrepancies to a second server, sending the alert message to the first server, and receiving the usage records associated with the discrepancies from the second server in response to sending the alert message to the first server.

In a further embodiment, generating the alert message that includes information suitable for causing the network component to resend usage records associated with the discrepancies may include generating the alert message to include information identifying one or more of a revenue loss, a subscriber associated with the revenue loss, a group of subscribers associated with the revenue loss, and a component associated with the revenue loss.

In a further embodiment, generating the alert message that includes information suitable for causing the network component to resend usage records associated with the discrepancies may include generating the alert message to include one or more of information identifying the usage records associated with the discrepancies, information identifying the discrepancies, and information suitable for causing a receiving server to apply correct usage charges for the discrepancies in reports of service usage.

Further embodiments include a system for reducing revenue leakage in a communication network. The system may include a charging gateway server having a first processor, a mediation server having a second processor, and a revenue assurance server having a third processor. The third processor in the revenue assurance server may be configured with processor-executable instructions to perform operations that include receiving usage records from the mediation server, performing revenue assurance operations to determine whether the received usage records indicate that there are discrepancies in reports of service usage, generating an alert message that includes information suitable for causing the mediation server to resend usage records associated with the discrepancies when the revenue assurance operations indicate that there are discrepancies in the reports of service usage, and sending the alert message to the charging gateway server. The first processor in the charging gateway server may be configured with processor-executable instructions to perform operations that include receiving the alert message from the revenue assurance server, identifying usage records associated with the discrepancies based on information included in the alert message, and resending the identified usage records to the mediation server. The second processor in the mediation server may be configured with processor-executable instructions to perform operations including receiving the usage records from the charging gateway server, and resending the usage records to the revenue assurance server.

A further embodiment may include a computing device, such as a server or router, configured with processor-executable instructions to perform operations of the embodiment methods described above.

A further embodiment may include a non-transitory processor-readable medium on which is stored processor-executable instructions configured to cause a processor to perform operations of the embodiment methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

The word "exemplary" is used herein to mean "serving as an example, instance, or illustration." Any implementation described herein as "exemplary" is not necessarily to be construed as preferred or advantageous over other implementations.

DESCRIPTION

Figure 1A:
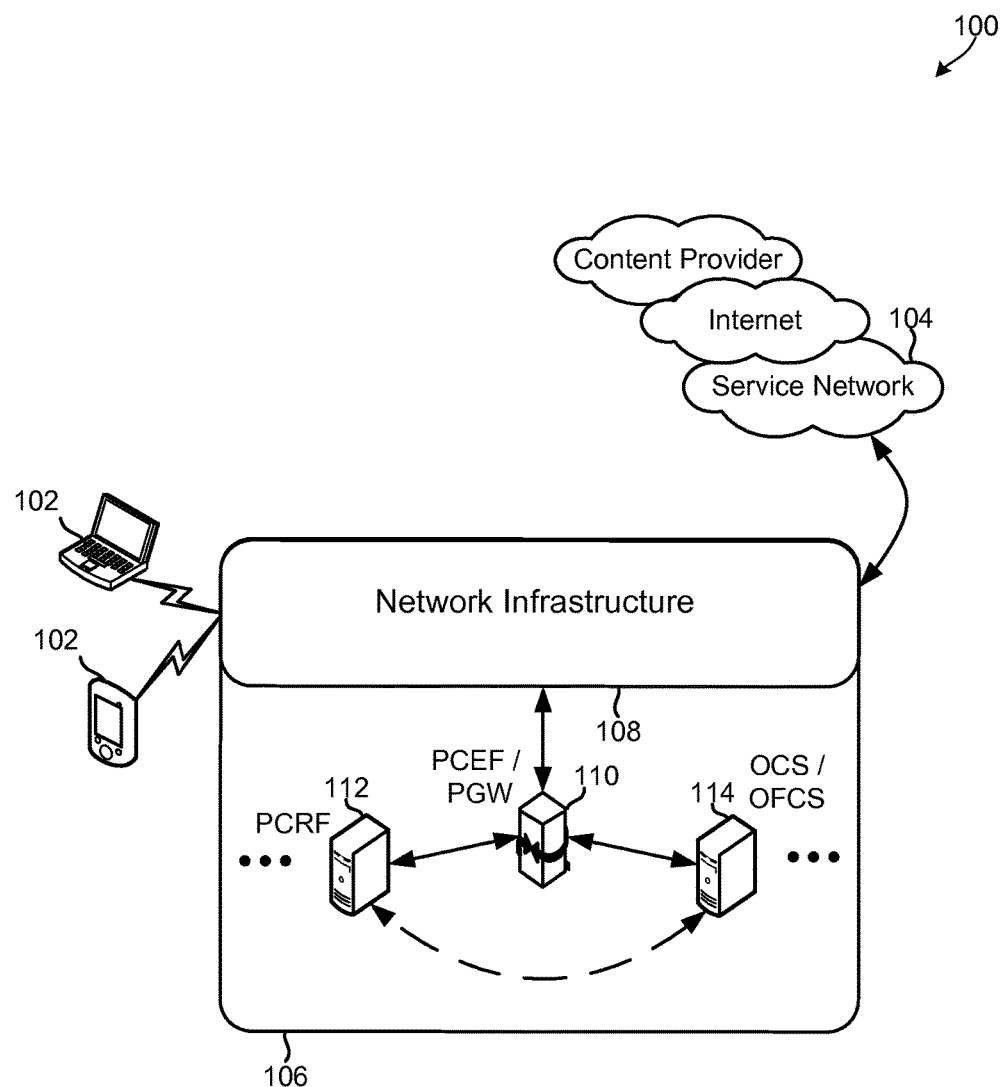
FIG. 1A is a system block diagram illustrating a telecommunications system suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

A number of different cellular, mobile, Wi-Fi, fixed-line, cable, and satellite communication services and standards are available or contemplated in the future, all of which may implement and benefit from the various embodiments. Such services and standards include, e.g., third generation partnership project (3 GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iden), Data Over Cable Service Interface Specification (DOCSIS), PacketCable, DSL, Broadband Forum, Metro Ethernet Forum, Wireless Broadband Alliance and various other fixed and mobile communications networks. Each of these technologies involves, for example, the transmission and reception of signaling, usage reports and content messages. It should be understood that any references to terminology and/or technical details related to an individual standard or technology are for illustrative purposes only, and are not intended to limit the scope of the claims to a particular communication system or technology unless specifically recited in the claim language.

As used in this application, the terms "component," "module," "node," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computing device, and/or a computing system.

The various embodiments include network components (e.g., server computing devices, etc.) configured to reduce or prevent revenue leakage in a telecommunication network, verify the completeness and accuracy of usage and billing data, ensure or verify that correct tariffs and/or policies are applied by the network, and support or facilitate the accurate and timely delivery of content to user equipment devices. The network components may be revenue assurance system components configured to receive service consumption information from a real-time charging system, receive usage information from a mediation system, and compare the service consumption information to the usage information to determine whether there are any inconsistencies in the usage records or inaccuracies in billing for the usage/consumption of the services. The network components may perform various operations to mitigate or correct the inconsistencies/inaccuracies, including requesting that other components in the network send or resend missing or additional information.

Generally, revenue assurance key performance indicators (KPIs) and solutions include measuring trends, performing trend analysis, and performing other similar operations to reassure a network operator that the various components of its revenue streams are complete and accurate. Network operators may divide their revenue assurance efforts into the channels from which revenues are generated, and tailor their efforts to these channels. Wherever possible, network operators seek conclusive evidence that their systems and processes are performing as expected, and they seek reliable independent data to prove that this is the case. Methods and tools typically used by network operators to accomplish this may include trend analysis of their operating data like monthly billed revenues, measurement and comparison of key input and output parameters across various systems from network elements through to billing and on to financial reporting, and analyses of the cost of sales data that may include charges and volumes supplied by other parties to the network operator versus the charges and volumes charged to users. The essence of all of these tests and analyses is to maintain confidence in the completeness and accuracy of the network operators' billing data, and to prove that their revenue assurance systems are performing both optimally and as expected.

Testing the completeness and accuracy of billing data can be completed by decomposing revenue into various streams, decomposing each stream into its fundamental parts, and examining and testing each of these fundamental parts. This may also include computing various values by performing any or all of the following algorithms/calculations/formulas:

Estimated Total Revenue=Total Number of Users*ARPU

ARPU=Voice ARPU+Data ARPU+Messaging ARPU+Service Charges ARPU where Service Charges may include monthly subscription charges, equipment rental fees, monthly charges for service options, charges for "service passes" for access to specific content (e.g., Facebook®) or services (e.g. roaming data), etc. The calculations may also include:

Voice Revenue =

Total Number of Domestic Voice Minutes∗Domestic Per Minute Rate +

(Total Number of International Voice Minutes per

Zone or Country∗Zone or Country per Minute Rate)

where "Zone" may represent a group of countries or a defined geographic region. The calculations may further include:

Data Revenue = Total Number of $MB$ Consumed∗Per $MB$ Rate

Messaging Revenue =

Total Number of Text Messages∗Per Text Message Rate +

Total Number of $MMS$ Messages∗$MMS$ Rate +

Total Number of $IM$ Messages∗Per $IM$ Rate

Services Charges Revenue = Total Number of Services and

Options Subscribed∗Monthly Rate per Service or Option

A network component may be configured to perform one or more of the algorithms/calculations/formulas listed above as part of a revenue assurance system and/or as part of an embedded rating function. For example, all the voice, data, messaging and content usage information may be processed in the network component as part of an embedded rating function, and the results of this processing may be compared with information received from a charging and/or billing system. Alternatively, the network component may perform the processing for a subset of subscribers, and compare these results with the corresponding subscriber charges received from the charging and/or billing systems. These and other validation operations may be performed on a regular basis (e.g., every bill cycle), or as occasional "spot checks" for specific network nodes or subscriber accounts on which significant changes have been made; for example, when a new account is activated for a large enterprise customer or when network equipment has been upgraded to a new software release or technology.

However, performing the above-mentioned processing/calculations as part of a revenue assurance system may become increasingly complex as new services (e.g., Rich Communications Services, videoconferencing and Internet Protocol television (IPTV)) are introduced by the network operators. This is mainly because such services may charge differently for the different aspects of each service. For example, an IPTV service may charge a user/customer for a specific piece of content, and that charge may be inclusive of the transport for the content (i.e., the charges for delivering the data volumes via the network). Similarly, a videoconferencing service may charge differently for the voice and video components because not all participants may join the call with video. Further, any file transfers that occur during a call (e.g., videoconferencing call) may be charged separately or differently. As such, revenue assurance systems must be sufficiently flexible and robust to accommodate these and other complexities associated with the new services being rolled out by network operators.

The various embodiments include network components configured to provide the network and network operators with a revenue assurance system that is suitable for preventing or reducing revenue leakage, and which is sufficiently flexible and robust to manage the complexities associated with the new services that are now being introduced by network operators.

As mentioned above, testing the completeness and accuracy of billing data may include decomposing revenue into various streams, decomposing each stream into its fundamental parts, and examining and testing each fundamental part. Decomposing revenues into their constituent parts is important for understanding revenues, in gaining assurance that these revenues are accurate and complete, and for determining whether the systems are operating as expected. However, various problems/errors may arise when decomposing revenues, such as loss of data to be processed (e.g., manual error, systems error, price plan configuration error, etc.) and/or rating errors (e.g., rating function is using obsolete or incorrect rates, etc.).

The various embodiments include network components configured to reduce the impact of such problems/errors (e.g., loss of data, rating errors, etc.), or to avoid or prevent the occurrence of such errors/problems.

The various embodiments may be implemented within a variety of communication systems, an example of which is illustrated in FIG. 1A. A typical communication system 100 includes user equipment 102 configured to send and receive voice, data, and control signals to and from a service network 104 (and ultimately the Internet and/or a content provider) via a communications network 106.

In the example illustrated in FIG. 1A, the communications network 106 includes a network infrastructure 108 unit that encapsulates various network components/systems, each of which may implement any of a variety of communication technologies/protocols to process and route the voice, data and control signals to and from the user equipment 102. For example, the network infrastructure 108 unit may include components for implementing a cellular telephone network, a radio access network (e.g., UTRAN, RAN, etc.), WiFi network, WiMAX network, and/or other well known communication technologies (e.g., GPRS, UMTS, LTE, cdmaOne, CDMA2000™). Since these structures are well known, certain details have been omitted in order to focus the descriptions on the most relevant features.

The network infrastructure 108 unit may include connections to a policy control enforcement function (PCEF) component 110, which may be responsible for enforcing policy rules to control the bandwidth, the quality of service (QoS), and other characteristics of the communications between the service network 104 and the user equipment 102. The enforcement of policies may also include querying, coordinating, removing, revoking and/or adjusting various resources (e.g., network resources, subscriber resources, etc.) based on the policy rules.

The PCEF component 110 may also be configured to send signaling information (e.g., control plane information relating to communication setup, security, authentication, charging, enforcement of policy rules, etc.) to a policy control rules function (PCRF) component 112, online/offline charging systems (OCS/OFCS) 114, and other similar components that participate in, collect information from, or otherwise contribute to, communications between the service network 104 and the user equipment 102.

Figure 1B:
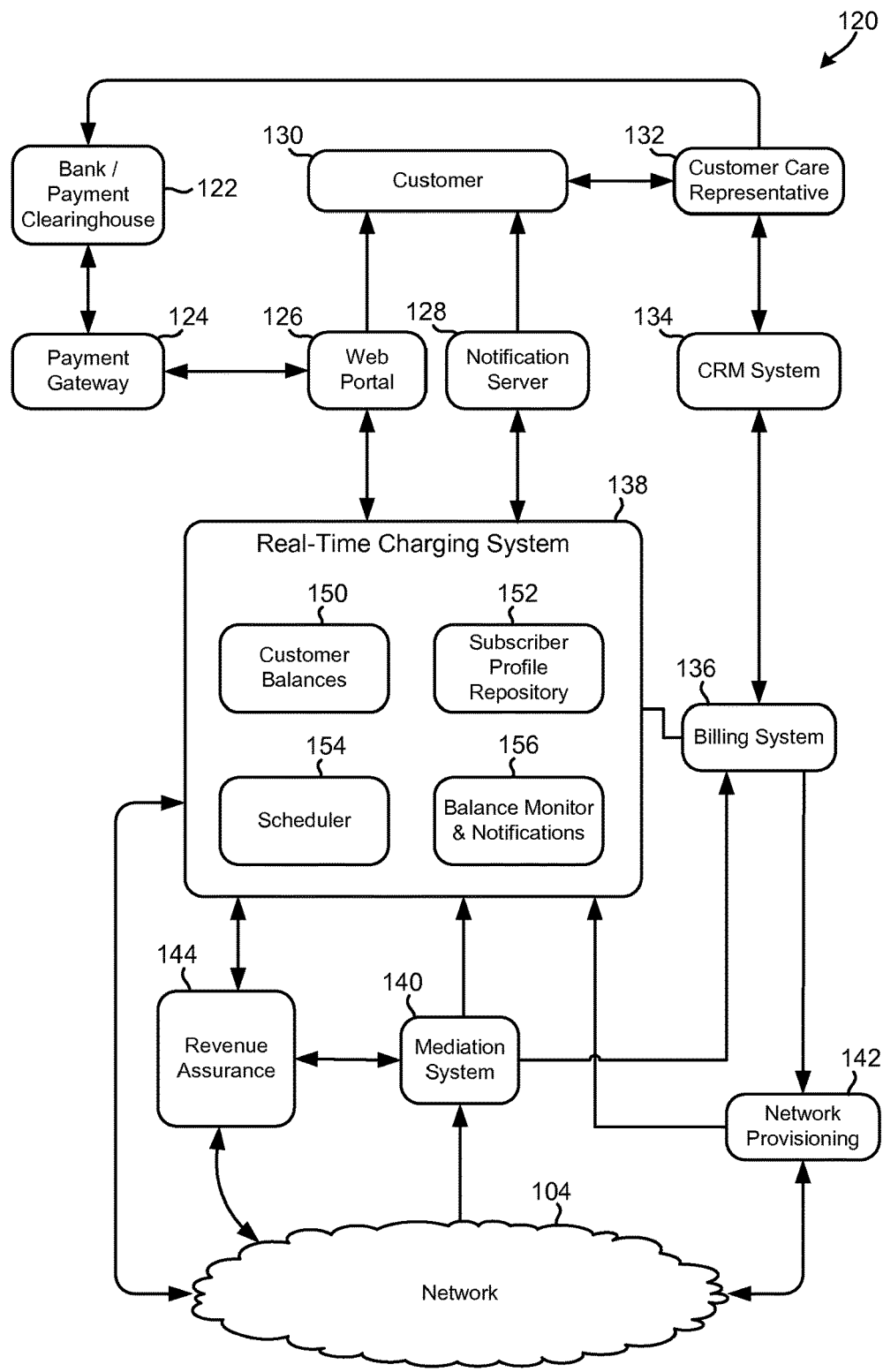
FIG. 1B is a system block diagram illustrating various logical and functional components in a telecommunications system implementing an embodiment revenue assurance system.

FIG. 1B illustrates various example logical and functional components that may be included in a telecommunications system 120 in which the various embodiments are implemented/included. These logical and functional components may be configured to generate, monitor, and analyze a vast array of information that may be used by the various embodiment components to provide network operators with a robust revenue assurance system.

In the example illustrated in FIG. 1B, the system 120 includes a bank/payment clearinghouse component 122, a payment gateway component 124, a web portal component 126, a notification server component 128, a customer component 130, a customer care representative component 132, a customer relationship management (CRM) system component 134, a billing system component 136, a real-time charging system component 138, a mediation system component 140, and a network provisioning component 142. The real-time charging system component 138 may include a customer balances component 150, a subscriber profile repository component 152, a scheduler component 154, and a balance monitor and notification component 156. In an embodiment, the real-time charging system component 138 may also include an OCS component (not illustrated in FIG. 1B). In an embodiment, the mediation system component 140 may include an OFCS component (not illustrated in FIG. 1B). Since many of these structures/components are well known, certain details have been omitted in order to focus the descriptions on the most relevant features.

The system 120 may also include a revenue assurance component 144 configured to communicate with the network 104, the mediation system component 140, and the real-time charging system component 138. The revenue assurance component 144 may be configured to perform various operations to ensure the integrity of billing and usage records generated for the access and usage of the network or services.

The revenue assurance component 144 may be implemented on a server or other suitable computing device coupled to the network and configured with processor-executable instructions to receive information regarding a mainline flow of billable usage of the network or services from the mediation system component 140, review/analyze the received usage information, and determine whether there are any anomalies with the usage of (or with the billing for the usage of) the network or services.

The revenue assurance component 144 may be configured to receive service consumption information from the real-time charging system component 138, compare the service consumption information to the usage information received from the mediation system component 140, and determine whether there are any inconsistencies in the service consumption information, usage information, or with the billing for the usage/consumption of the services. The revenue assurance component 144 may be configured to request that the network 104 send or resend missing or additional information for usage/billing information that is determined to be inconsistent or otherwise problematic.

In various embodiments, the revenue assurance component 144 may be configured to receive information from any of the components 122-142 in the system 120, which may be accomplished via the real-time charging system component 138.

As mentioned above, the components 122-142 may generate, monitor, and analyze information that may be used by the revenue assurance component 144 to provide the network and/or network operators with a robust revenue assurance system.

For example, the revenue assurance component 144 may use information received from the components 122-142 described above, as well as other components to generate real-time statistical counters based on observed traffic volumes, usages, usage patterns, and exceptional operational behavior (e.g., no collection events, failed collection events, etc.). The revenue assurance component 144 may analyze real-time statistical data to produce trend analysis and generate output alerts and reports, such as standard deviation alerts. These reports may be generated information that is retrieved from databases of statistics and/or modeled in a reporting system (e.g., Business Objects or Crystal Reports®). The revenue assurance component 144 may perform either global consistency checks or spot consistency checking of the provisioning of active subscribers in the network, including checks of a home location register (HLR), Radius authentication, authorization, and accounting (AAA) databases, Subscriber Profile Repository (SPR) databases, and various other operational support system (OSS) databases. For example, the revenue assurance component 144 may sweep an entire subscriber base every month to verify that all provisioned numbers correspond with billed subscribers. Similarly, the revenue assurance component 144 may compare usage records against the subscriber's profile to ensure that the network usage information that is being generated corresponds to a service that the subscriber has paid for and to which he or she is entitled.

The revenue assurance component 144 may be configured to receive/monitor an audit feed (e.g., via an SS7 probe) of the control link on all SS7 interconnect links and verify interconnect traffic volumes into interconnect switches as reported in roaming settlements processes, such as Transferred Account Procedure (TAP).

The revenue assurance component 144 may be configured to receive/monitor feeds from content providers and content gateways, and verify the actual content delivered by an off-network content aggregator.

The revenue assurance component 144 may be configured to verify that IP and interconnect roaming activity corresponds with observed traffic volumes.

The revenue assurance component 144 may be configured to track revenues generated and/or leaked through promotional programs offered by the network operators or in partnership with third-party partners.

The revenue assurance component 144 may be configured to perform balance and policy validation operations prior to transaction authorization for real-time services.

In various embodiments, the revenue assurance component 144 may include or may be a Data Usage Offline Processor (DUOP) component that operates independent of, in parallel with, and/or adjunct to other systems/components that perform the "live" processing aspects of network usage monitoring, analysis, and/or reporting operations.

In an embodiment, the revenue assurance component 144 may be configured to validate that the rating and charging systems are operating accurately by re-rating of all or a subset of collected usage information. The subset of usage information may be selected/obtained by sampling a larger batch usage feed and/or may include one or more time-slices of a real-time usage feed. The revenue assurance component 144 may also be configured to generate logs, records, or other information that are suitable for use as evidence for legal and regulatory purposes (e.g., Sarbanes-Oxley Act compliance) and/or to assure network operators that the systems are operating properly. The revenue assurance component 144 may be configured to trigger alerts in the rating, charging and/or billing systems and/or a system administrator when the re-rating operations identify anomalies in the usage information. That is, the revenue assurance component 144 may generate and send an alert or notification message to the system administrator and/or to the rating, charging, or billing systems to inform them of the anomalies that are discovered in the collected usage information so that these systems may respond accordingly.

In an embodiment, the revenue assurance component 144 may be configured to perform operations for accomplishing real-time rating and reporting of prepaid Internet Protocol (IP) based transactions. The revenue assurance component 144 may continually monitor and compare expected/computed/predicted activity information with actual/measured activity information, and generate alerts or notification messages when an activity, volume, or value falls below an expected level or threshold. As part of these operations, the revenue assurance component 144 may compare Event Detail Record (EDR)/Charging Data Record (CDR) values to historical trends, values for a corresponding or previous period, volumes and/or activity reported from other markets, regions, data centers, networks, or systems.

In various embodiments, the revenue assurance component 144 may be configured to perform any or all of a number of different revenue assurance algorithms/techniques. Examples of such revenue assurance algorithms/techniques include gap analysis, time gap analysis, sequence number analysis, duplicate analysis, correlation of reported volumes across multiple usage data sources, reconciliation of balances across all sessions for all users of the shared account balance, statistical count analysis, audit trails, exceptions, and alerting algorithms/techniques.

In an embodiment, the revenue assurance component 144 may be configured to perform gap analysis operations, which may include analyzing usage records or real-time messages received from various network components to determine whether a gap exists in the feed or that the usage records that are expected in a given feed are missing. The revenue assurance component 144 may raise/generate an alert/notification when it determines that a gap exists in the feed. For example, the revenue assurance component 144 may raise/generate an alert/notification when it determines that there exists a gap in the series of Diameter credit control request messages, and send the alert/notification to the real-time charging system for a given subscriber data session on the network.

In an embodiment, the revenue assurance component 144 may be configured to perform time analysis operations, which may include determining whether usage records are missing by comparing a time or date stamp of the last usage record received from a network component to a first time or date stamp of the next usage record received from that the same network component. The revenue assurance component 144 may raise/generate an alert/notification when it determines that there is an unexpected time gap between the usage records. For example, if a network component typically sends usage records every five minutes, then a ten minute gap between sent usage records may cause the revenue assurance component 144 to trigger an alert.

In an embodiment, the revenue assurance component 144 may be configured to perform sequence number analysis operations, which may include determining whether there are any gaps in the data stream by comparing a sequence number of a last received batch file against a sequence number of a subsequent or next received batch file. The revenue assurance component 144 may apply this analysis to groups of records to verify that there are no gaps in the sequence numbers of the records. The revenue assurance component 144 may also apply this analysis to detect duplicate files or records, and cause the mediation system component 140 to remove the duplicate files or records (e.g., by triggering an alert, etc.).

In an embodiment, the revenue assurance component 144 may be configured to perform duplicate analysis operations, which may include determining whether a file or usage record has been previously collected or processed over a specific time period or volume. This allows the revenue assurance component 144 to verify the completeness and/or accuracy of usage or billing data by assuring that the same file or usage record has not been previously collected or processed for a specific time period or volume. Early identification of duplicate records helps to avoid issues, such as incorrect billing or over-reported revenues, in downstream systems. In a further embodiment, the revenue assurance component 144 may be configured to trigger alerts when the number of duplicates in a specified time period exceeds a defined threshold; such a condition may be indicative of other issues in the network that require further investigation to ensure the integrity of the revenue stream.

In an embodiment, the revenue assurance component 144 may be configured to perform operations to correlate reported volumes across multiple usage data sources. Such operations may include comparing usage volumes for a specific subscriber session that are reported by one network component (e.g., SGSN, S-GW, etc.) with the usage volumes reported for that same session by another network component (e.g., GGSN, P-GW). The revenue assurance component 144 may trigger an alert when it determines that there are discrepancies in the reported usage volume and/or when the discrepancies exceed a specified tolerance level or threshold value. These operations allow the revenue assurance component 144 to detect and accommodate valid conditions, such as the retransmission of a real-time message or the re-sending of a batch file from a source system, so that it may respond only to the conditions that are problematic or invalid.

In an embodiment, the revenue assurance component 144 may be configured to perform statistical count analysis operations, which may include monitoring or counting the number of received usage records, and comparing this information to a statistical feed or historical data received from a network component. The statistical count analysis operations may also include receiving a count of the usage records and the actual usage detail records from a network component, comparing these two quantities to determine whether there are any differences in the received information and/or whether the differences exceed a defined tolerance level, and triggering an alert when there are differences in the compared quantities or when the differences exceed a defined tolerance level.

In an embodiment, the revenue assurance component 144 may be configured to perform audit trail tracking operations, which may include marking a generated usage record with a unique identifier, and using the unique identifier to track the usage record throughout the network, (e.g., from mediation through rating and billing, and optionally into downstream financial reporting systems). The audit trail tracking operations may also include linking the identifiers of usage records. For example, usage detail records may be aggregated into "summary" records that may have their own unique identifier. The revenue assurance component 144 may link each usage detail record's unique identifier to that of its corresponding aggregate summary record to track the summary record through the various downstream systems to which such summary records may be distributed. As another example, usage detail records may be split by a charging system into multiple child records, and each of these child records may include its own unique identifier. As such, the revenue assurance component 144 performs the audit trail tracking operations so that the usage detail records that are split by the charging system into multiple records may be tracked, and so that individual components of a delivered service may be charged separately or portions (e.g., first 15 minutes or first 50 MB) of the delivered service may be billed to different entities. This may be accomplished by linking each new "child" record's unique identifier to that of its "parent" record so that the unique identifier of the child record may be tracked through various downstream systems to which such records may be distributed.

In an embodiment, the revenue assurance component 144 may be configured to correct or discard unexpected or incorrect usage records. In an embodiment, the revenue assurance component 144 may be configured to store usage records in an error repository for further analysis. In an embodiment, the revenue assurance component 144 may be configured to determine whether a record is correctable, and report as lost revenue erroneous records that are deemed to be uncorrectable (e.g., records containing unreadable or corrupt information). In an embodiment, the revenue assurance component 144 may be configured to perform re-rating operations, which may include determining an estimated cost value for the erroneous records that are determined to be uncorrectable and/or reported as lost revenue.

In an embodiment, the revenue assurance component 144 may be configured to cause an alert message to appear in a graphical user interface (GUI) of a system administrator component. Such alert messages may be used to notify a system administrator of issues with specific usage and/or erroneous records. Such alert messages may also cause a system administrator component to automatically perform operations to mitigate or correct the identified issues and/or erroneous records. The alerts may be sent via communication signals, communication messages, system console notifications, emails, SMS messages, etc. In an embodiment, the alerts may include information identifying a level of severity of the alert, enabling the system administrator to take an appropriate corrective action (or no action at all) based on the level of severity.

Various embodiment components (e.g., revenue assurance component 144, etc.) may be configured to generate, receive and/or use one or more network related key performance indicators (KPIs), such as data traffic KPIs, real-time charging KPIs, file stream KPIs, IMS KPIs, and error tracking KPIs. Data traffic KPIs may be generated to include some or all of packet analyzer collector instance identities, a start timestamp of the statistical period, a stop timestamp of the statistical period, a count of usage records collected, a count of invalid usage records, a count of duplicate usage records, a count of source IP filtered usage records, a count of destination IP filtered usage records, a count of MMS usage records, a count of GPRS and LTE usage records, a count of uplink and downlink volume for MMS, and a count of uplink and downlink volume for other packets. Real-time charging KPIs may be generated to include some or all of a count of user profile requests, a count of service authorization requests, a count of service reauthorization requests, a count of service stop messages, count of event charging requests, a count of quota return messages, a count of quota requests, and a count of quota return messages. File stream KPIs may be generated to include some or all of an input file name, a count of valid usage records, a count of invalid usage records, a count of filtered usage records, and a count of total billable minutes. IMS KPIs may be generated to include some or all of a count of accounting request (ACR) start records collected, a count of ACR intermediate records collected, a count of ACR stop records collected, a count of unmatched stop records, a count of unmatched start records, a count of error records, a count of output sessions, and for each type of call session control function (i.e., Serving-CSCF, Proxy-CSCF and Interrogating-CSCF) CDR, the count of output, the count of timed-out, and the count of duplicate records. Error tracking KPIs may be generated to include some or all of a usage record type, an error code, an error reason, a count of uplink volume, a count of downlink volume, an identifier of a served IMSI, an identifier of a served MSISDN, a GGSN or PDN-Gateway (P-GW) address, a charging identity, a served PDP address, an original data volume uplink, an original data volume downlink, a new data volume uplink, a new data volume downlink, a usage record opening time, a usage record closing time, a time stamp, and a duration. For usage records that are rated by the charging system or by an external third-party, revenue assurance KPIs may be generated to include monetary amounts of the calculated charges.

In an embodiment, the revenue assurance component 144 may be configured to receive a first usage record that includes information identifying a service usage in a first unit of measurement, receive a second usage record that includes information identifying service usage in a second unit of measurement, convert the information identifying service usage in the first unit of measurement into converted unit information (e.g., information identifying service usage in the second unit of measurement or in a baseline unit of a measurement), and compare the converted unit information to the information included in the second usage record to determine whether there are discrepancies in the reports of service usage. That is, the revenue assurance component 144 may receive usage information for the same service from a plurality of network components, each of which may measure the delivered service in different units. As such, the revenue assurance component 144 may be configured to map each of the different measurements to a common baseline set of metrics (e.g., converted unit information), and perform a comparison of the reported usage to identify anomalies. For example, the revenue assurance component 144 may be configured to compare usage for a SIP-based voice service reported from a Telephony Application Server (TAS) in units of time (e.g., minutes) with usage for that same service reported from a P-GW in units of data consumption (e.g., megabytes) by applying a benchmark conversion rate based on the type of voice service (Standard Definition or High Definition) delivered. As another example, the revenue assurance component 144 may compare data volumes for a completed movie download reported by a P-GW with the corresponding metadata information for that movie obtained from the content server.

The various embodiment components may be deployed or included in both mobile and fixed-line post-paid telecommunications networks, and also in telecommunications networks that support real-time charging and usage management functions, such as prepaid or content delivery networks.

In embodiments in which the revenue assurance component 144 is deployed/included in a post-paid telecommunications network, there may be direct network to information systems (e.g., business support systems, operation support systems) traceability irrespective of the intermediate components (e.g., network charging gateways). In these embodiments, the revenue assurance component 144 may be configured perform various operations to accomplish the automated identification of missing usage records. This is in contrast to existing solutions, which are generally manual processes that require human interaction or are otherwise painstaking, tedious, error prone, costly and/or time-consuming.

In an embodiment, the revenue assurance component 144 may be configured to accomplish early detection of missing usage records, such as before the system's retention period for that usage expires and the usage is purged. The revenue assurance component 144 may request that the network re-send the missing usage records before the downstream systems notice that they are missing. Thus, lost usage can be recovered within the billing cycle, and revenue loss or billing delays may be prevented.

In a further embodiment, the revenue assurance component 144 may be configured to use the sequence numbers of usage records (e.g., CDRs) generated by other network components (e.g., GGSNs, P-GWs, content servers, etc.) to identify missing usage records. The revenue assurance component 144 may initiate the performance of manual and/or automated operations to recover the missing usage records/information from the network. An advantage of this approach is that the analysis may be performed offline (i.e., as an adjunct process which may operate in real-time or near real-time) so that it does not negatively impact production OSS/BSS systems within the operator's environment.

In an embodiment, the revenue assurance component 144 may be configured to perform separate usage record tracking operations for each network component. The revenue assurance component 144 may generate alerts for missing usage records, and these alerts may contain information identifying the missing usage records (e.g., origin network component, timestamp, etc.). The revenue assurance component 144 may cause a specific network component replay or re-send missing usage records (e.g., by sending a request message to the network component) and/or to request recovery replays during an extended period of time. This recovery period may be set or defined by the network operator. In an embodiment, the revenue assurance component 144 may be configured to perform focused or heightened revenue assurance operations based on the characteristics of specific network components, geographic regions, third-party partners, and market segments.

Figure 2:
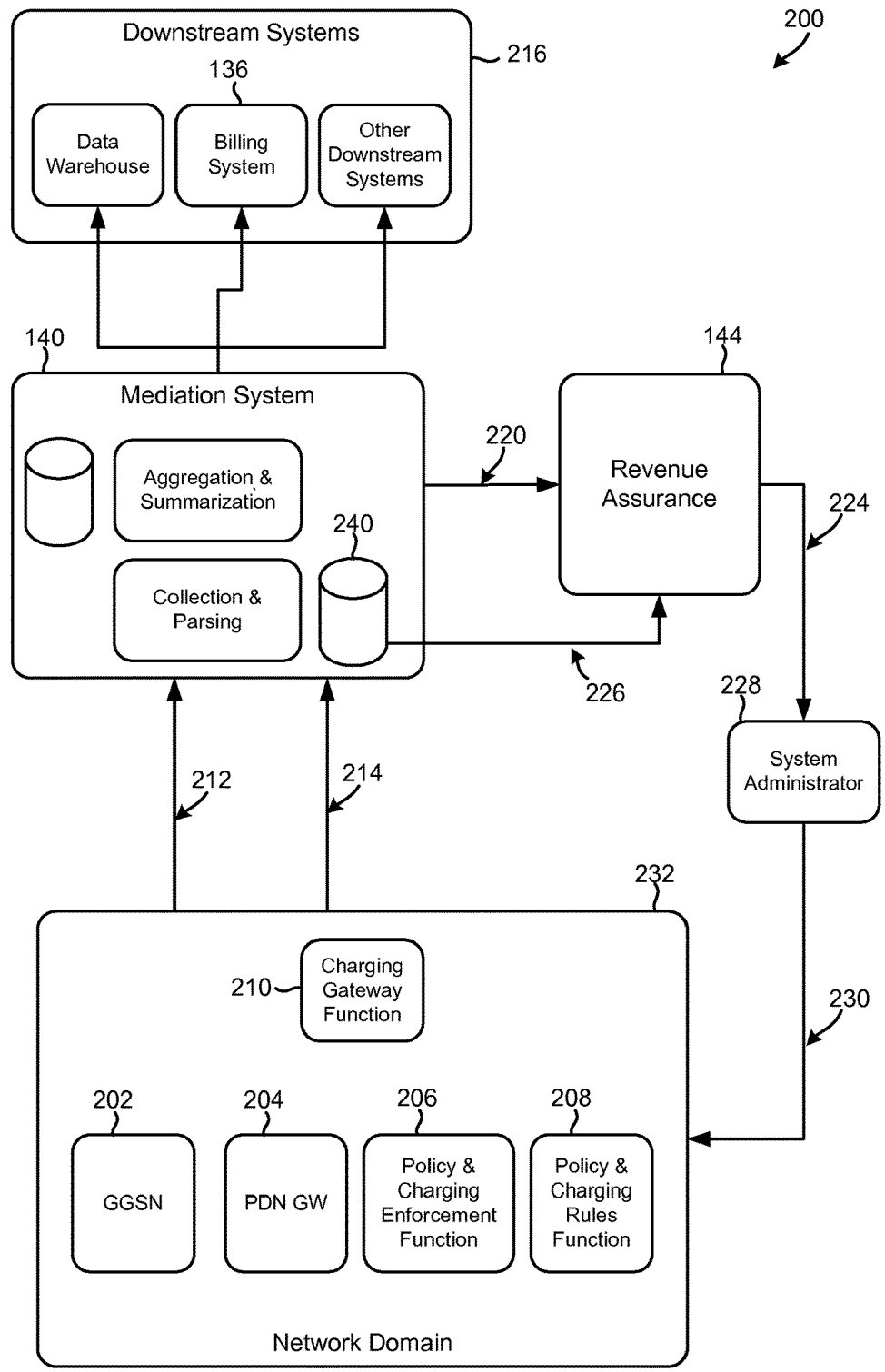
FIG. 2 is an architectural diagram illustrating various components and information flows in an embodiment post-paid revenue assurance system.

FIG. 2 illustrates various components and information flows in an embodiment post-paid revenue assurance system 200. In the example illustrated in FIG. 2, the post-paid revenue assurance system 200 includes a mediation system component 140, various downstream system components 216, a revenue assurance component 144, a system administrator component 228, and network domain components 232.

The network domain components 232 may include a GGSN component 202, a packet data network gateway (PDC GW) component 204, a PCEF 206, a PCRF 208, charging gateway function component 210, and other similar components. Components 202-208 may generate usage records and/or real-time service requests as users consume services in the network. These usage records and other service-related transactions may be sent from these network components 202-208 to a mediation system component 140 in the operator's business support systems (BSS) domain. In an embodiment, this data may be forwarded using a defined interface 212 to the mediation system component 140 via a charging gateway function component 210 in the network domain. The charging gateway function component 210 may provide a store-and-forward capability that allows replaying or re-sending of transactions or usage records. The mediation system component 140 may receive and process the usage records, and distribute them to one or more downstream systems 216, such as a billing system 136. The mediation system component 140 may also store the received and/or processed usage records in an archive data store 240.

The revenue assurance component 144 may be configured to receive usage records from the mediation system component 140, and process this information "offline" to mitigate the impact on the mediation system's 140 active processing of "live" network data. The revenue assurance component 144 may also be configured to receive usage record feeds 220 from the mediation system component 140, determine whether there are discrepancies or other issues with the usage records, and trigger alerts 224 to a system administrator 228 when it determines that there are discrepancies or other issues with the usage records or usage record feeds 220. The alerts 224 may include information that is available in the revenue assurance component 144 and that allows the system administrator component 228 to target a specific network element(s) 202-206. As such, the alerts 224 may cause the system administrator component 228 to request a re-send 230 of a subset of the usage records/information from the network's charging gateway function component 210, which may be accomplished by targeting/identifying a specific network element 202-206 in the re-send a request 230.

The network domain components 232 may send a re-send usage feed 214 to the mediation system component 140, which may receive and forward the re-send usage feed 214 to the revenue assurance component 144 via the replay usage interface 226.

In an embodiment, the revenue assurance component 144 may be configured to automatically trigger a re-send request directly to the network's charging gateway function component 210 or directly to an external system in a partner's or other third-party's domain.

Figure 3:
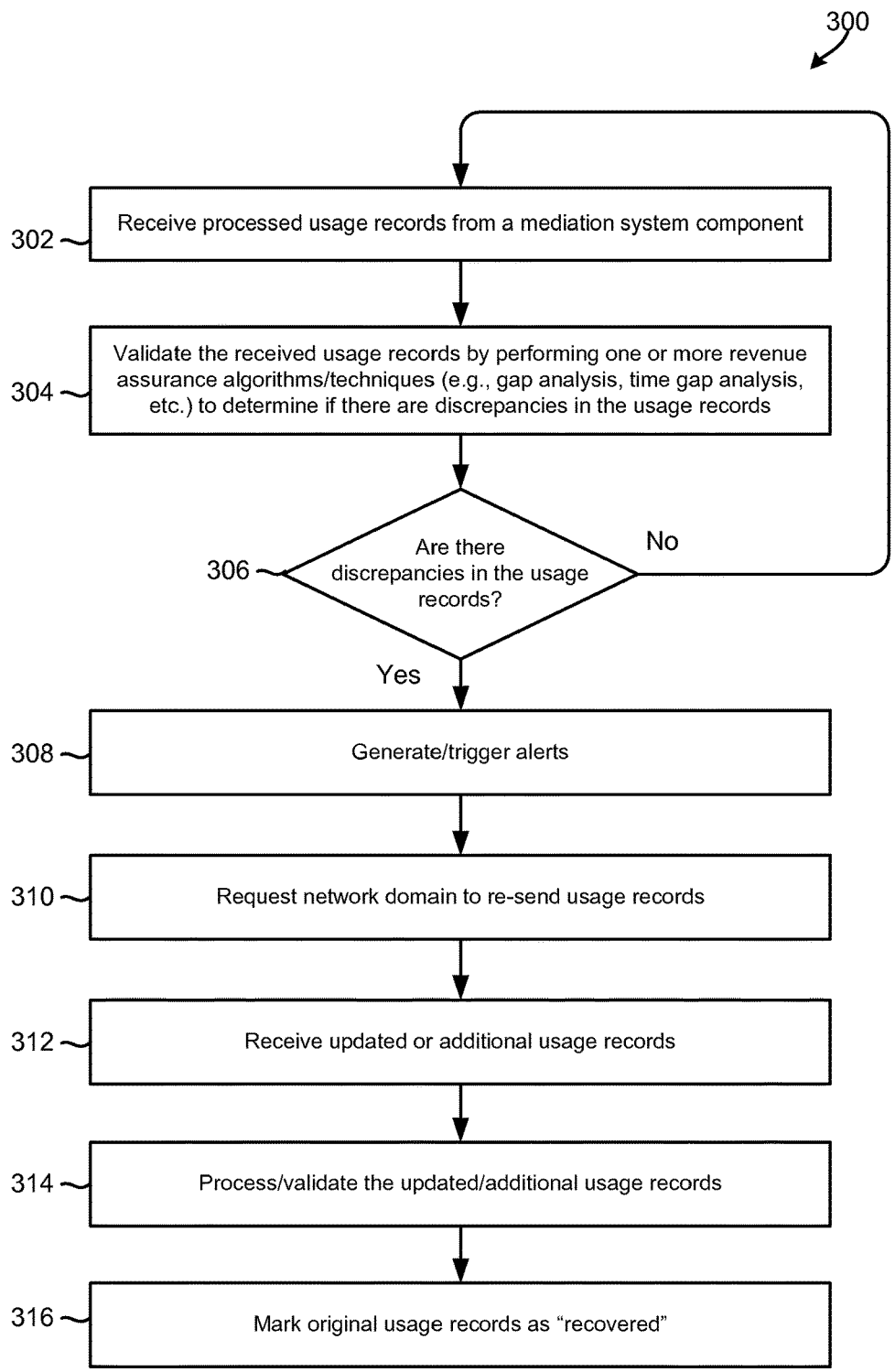
FIG. 3 is a process flow diagram illustrating an embodiment method of preventing revenue leakage in post-paid revenue assurance system.

FIG. 3 illustrates an embodiment method 300 for preventing revenue leakage that may be implemented in a post-paid revenue assurance system, such as the post-paid revenue assurance system 200 described above with reference to FIG. 2. The method 300 may be performed by a processing core in a computing system (e.g., server computing device) that implements or includes all or portions of the revenue assurance component 144.

In block 302, the processing core may receive processed usage records from a mediation system component 140. The processed usage records may be usage records generated by network components within the network layer, and collected and processed (e.g., parsed, validated, etc.) by the mediation system component 140.

In block 304, the processing core may perform revenue assurance operations to determine whether the received usage records indicate that there are discrepancies in the service usage reports. For example, the processing core may validate the received usage records by performing operations to accomplish one or more revenue assurance algorithms/techniques discussed above, such as gap analysis, time gap analysis, sequence number analysis, duplicate analysis, correlation of reported volumes across multiple usage data sources, statistical count analysis, audit trails, exceptions, alerting, and reconciling balances across all sessions for all users of the shared account balance.

In determination block 306, the processing core may determine whether there are any problematic usage records or discrepancies in the usage records (e.g., missing records, a gap in a feed or data stream, etc) based on the results of performing the revenue assurance operations. When the processing core determines there are no discrepancies in the usage records (i.e., determination block 306="No"), the processing core may determine that received usage records are valid. The processing core may repeat the operations of blocks 302-306 when additional processed usage records are received.

When the processing core determines there are discrepancies in the usage records (i.e., determination block 306="Yes"), the processing core may generate/trigger alerts in block 308. The processing core may generate the alerts by generating alert communication messages that include information suitable for identifying various details of the discrepancies or problematic usage records (e.g., identification numbers and timestamps of missing usage records) and/or that include information for resending the usage records. The alerts may be generated for presentation to a human (e.g., a system administrator) and/or to cause another component within the telecommunication network or in an external system (e.g., a partner's or other third-party's network domain) to perform various operations to mitigate or correct the identified discrepancies or problems.

For example, in block 308, the processing core may generate an alert message that includes information suitable for causing a network component to resend usage records associated with an identified discrepancy or problematic usage record. This may be accomplished by generating the alert message that includes information suitable for causing a first server (e.g., a server that includes or implements all or portions of the charging gateway function component 210) to resend the usage records associated with the discrepancies to a second server (e.g., a server that includes or implements all or portions of the mediation system component 140) that processes and resends the usage records to the processing core.

In various embodiments, in block 308, the processing core may generate the alert message to include information identifying the discrepancies or the usage records associated with the identified discrepancies. In an embodiment, the processing core may generate the alert message to include information suitable for causing another component (e.g., a charging system component) to apply correct usage charges based on the identified discrepancies in the reported service usage. In an embodiment, the processing core may generate the alert message to also include information identifying a revenue loss associated with an identified discrepancy or problematic usage record, a subscriber (or a group of subscribers) associated with the revenue loss, discrepancy, or problematic usage record.

In block 310, the processing core may request that a component within the network layer (e.g., in the network domain 232) re-send usage records that were determined to be incomplete, missing, or otherwise problematic. In an embodiment, this may be accomplished by the processing core triggering an alert suitable for causing the system administrator component 228 to send a re-send request to one or more components in the network domain 232. In response, one or more of the network domain components may re-send the incomplete or missing usage records to the mediation system component 140, which may receive and process the records, discard any duplicated records, and forward the processed records to the processing core.

In block 312, the processing core may receive new, updated, or additional processed usage records from the mediation system component 140. In block 314, the processing core may validate the new or additional usage records and/or otherwise verify that the discrepancies identified in block 306 have been addressed. In block 316, the processing core may mark the original usage records as being recovered. Also in block 316, the processing core may remove/terminate the alerts generated/triggered in block 308.

Figure 4:
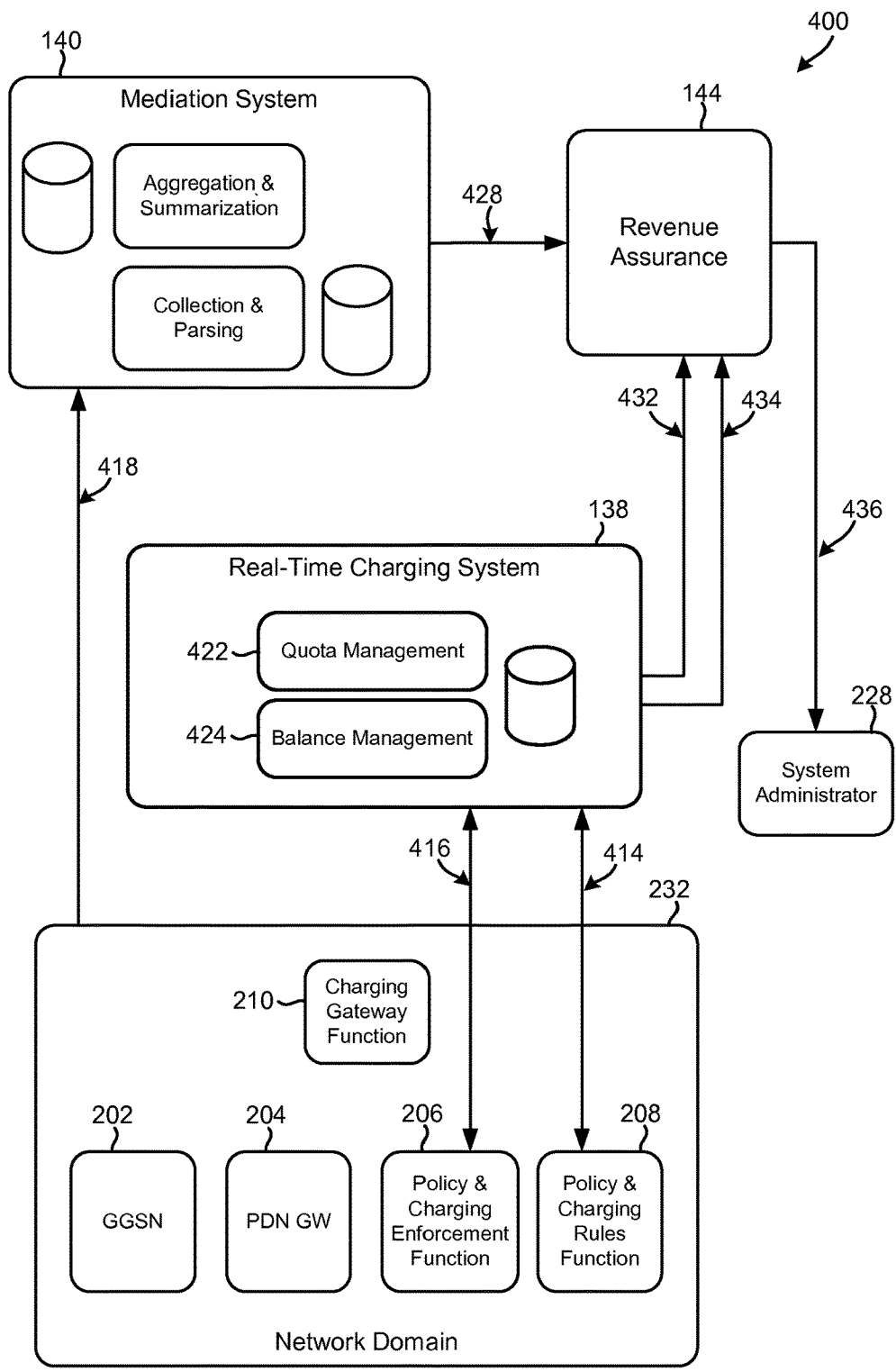
FIG. 4 is an architectural diagram illustrating various components and information flows in an embodiment revenue assurance system that is suitable for use in a telecommunications network that supports real-time charging.

FIG. 4 illustrates various components and information flows in an embodiment real-time (or near real-time) revenue assurance system 400 that is suitable for use in a telecommunications network that supports real-time charging. In the example illustrated in FIG. 4, the revenue assurance system 400 includes a mediation system component 140, a real-time charging system component 138, a revenue assurance component 144, a system administrator component 228, and network domain components 232. The real-time charging system component 138 may include a quota management component 422 and a balance management component 424.

The mediation system component 140 may be configured to communicate with other components 202-210 in the network domain 232 via an interface 418. In an embodiment, the real-time charging system component 138 may be configured to communicate with other components 202-208 in the network domain 232 via a defined interface 414 that uses a usage monitoring and reporting protocol, such as an interface based on the Sy protocol defined in 3GPP specifications (or any other Sy-like protocol). In an embodiment, the real-time charging system component 138 may also be configured to communicate with other components 202-208 in the network domain 232 via a defined interface 416 that uses a charging and reporting protocol, such as an interface based on the Gy protocol defined in 3GPP specifications (or any other Gy-like protocol). In the example illustrated in FIG. 4, the real-time charging system component 138 communicates with a PCRF component 208 via a first interface 414, and with the PCEF component 206 via a second interface 416.

The revenue assurance component 144 may be configured to perform various revenue assurance operations to detect missing usage records. For example, the revenue assurance component 144 may detect missing usage records by correlating network usage information that originates from the components 202-210 in the network domain 232. Usage records and other service-related transactions from these components may be sent from the network domain 232 to the mediation system component 140 in the operators BSS domain via interface 418 and/or via the charging gateway function component 210. The mediation system component 140 may send the usage records and/or usage record feeds 428 to the revenue assurance component 144. Similarly, the real-time charging system component 138 may send usage information to the revenue assurance component 144 via an interface 432. As such, the revenue assurance component 144 may receive the two distinct sets of usage information via two different interfaces 432 and 428. In addition, the revenue assurance component 144 may receive, via another interface 434, a list of user devices, and associated balance update history, that are being monitored by the balance management component 424 in the real-time charging system component 138.

The revenue assurance component 144 may compare and analyze the information received from different sources to identify discrepancies in the usage information, and reconcile the discrepancies based on the operator's business rules or report the discrepancies as potential lost revenue. This may be accomplished by performing revenue assurance operations. For example, in an embodiment the revenue assurance component 144 may be configured to correlate usage data received from the mediation system component 140 with usage data received from the balance management component 424 of the real-time charging system component 138 to identify discrepancies between these sources. In various embodiments, such correlations may be performed by using one or more of the ChargingID, Session ID, and/or IP Address as a joining key.

In an embodiment, the revenue assurance component 144 may be configured to identify and initiate the recovery of default usage information that is measured in the network components 202-206 but not reported to the real-time charging system component 138 via an interface 414. Such reporting failures may occur for a variety of reasons, such as maintenance or connectivity issues between the PCRF component 208 and the real-time charging system component 138.

In an embodiment, the revenue assurance component 144 may be configured to perform revenue assurance operations to reconcile usage records. The reconciliation of usage records may be accomplished between network elements 202-206 and the real-time charging system component 138 via the interface 414 (e.g., Sy reference point transactions) and/or on a session-by-session basis. The reconciliation of usage records may include reconciling total session usage between the balance management component 424 and the mediation system component 140. The reconciliation of usage records may also include recovering missing usage information from offline usage records. In an enhanced embodiment, the reconciliation of usage records may include automatically recovering lost usage information when a unique identifier (e.g., a ReportID, etc.) is provided on each transaction on the interface 414. This unique identifier (e.g., a ReportID, etc.) may also be provided in the G-CDR or P-GW CDR and may uniquely identify the transactions reported by the PCEF 206 for a given session.

In an embodiment, the reconciliation of usage records may be accomplished between network elements 202-210 and the real-time charging system component 138 via the interface 414 (e.g., Sy reference point transactions) and/or on a MSISDN-by-MSISDN basis. In this embodiment, reconciliation of usage records may include identifying missing usage records that span entire sessions. The reconciliation of usage records may also include recovering missing sessions' usage information based upon the operator's business rules; for example, subscribers' balances in the real-time charging system component 138 may be updated to reflect the missing usage if the current billing cycle for those subscriber accounts is still open.

The revenue assurance component 144 may also be configured to identify and initiate the recovery of default usage information that is measured in the network components 202-210 but not reported to the real-time charging system component 138 via interface 416. That is, the system 400 may identify anomalies between usage that is reported to the real-time charging system via the interface 416 and the corresponding usage that was reported by the network elements 202-210 to the mediation system component 140 via interface 418. Such discrepancies/reporting failures may occur for a variety of reasons, such as maintenance or connectivity issues between the PCEF component 206 and the real-time charging system component 138.

In an embodiment, the reconciliation of usage records may include reconciling usage information from across network sessions for multiple services or devices or multiple users that are part of a shared account balance plan that is managed in the balance management component 424 of the real-time charging system component 138. In such embodiments, the revenue assurance component 144 may be configured to receive usage feeds 432 from the real-time charging system component 138 for each session for a shared account balance, and receive corresponding usage feeds 428 from the mediation system component 140. Additionally, the revenue assurance component 144 may receive from the real-time charging system component 138, via a defined interface 434, detailed information for the shared account balances, including balance update history. The revenue assurance component 144 may then correlate in a step-by-step manner the usage activity and corresponding subscriber balance updates reported by the real-time charging system component 138 with the usage activity reported by the mediation system component 140. In various embodiments, the revenue assurance component 144 may perform this processing for every subscriber session for a shared account balance, for a sample subset of shared account balances, or for a sample subset of sessions for one or more shared account balances. The revenue assurance component 144 may trigger alerts to a system administrator for further investigation when discrepancies are identified. The revenue assurance component 144 may also reconcile any such discrepancies based on the operator's business rules, or report the discrepancies as potential lost revenue. In this manner, the revenue assurance component 144 helps ensure that no revenue losses occur in the real-time charging system and related components during the complex process of quota management and supervision across multiple concurrent network sessions that are managed across multiple network data centers, with all sessions consuming from at least one shared account balance.

Further embodiments may support revenue assurance for various network components, such as content delivery servers, over usage reporting interfaces that are proprietary.

In an embodiment, the revenue assurance component 144 may be configured to determine whether two or more usage records identify the use of the same service differently, and in response, generate an alert message or perform other operations to correct the discrepancy in the service usage reporting. For example, the revenue assurance component 144 may receive a first usage record that identifies the use of a first type of service and a second usage record that identifies the use of a second type of service. The revenue assurance component 144 may perform revenue assurance operations to determine whether the first usage record and the second usage record relate to the delivery of the same service and/or identify the usage of the same service or the same type of service. Such operations are useful in scenarios in which two records relate to a single service but identify that service differently. As a simple example, both records may identify a service as a five minute phone call, but one record might identify it as a local call, and the other record may identify it as an international call. In such scenarios, the revenue assurance component 144 may prevent a charging system from charging a customer incorrectly for the use of the single service (i.e., five minute phone call).

Figure 5:
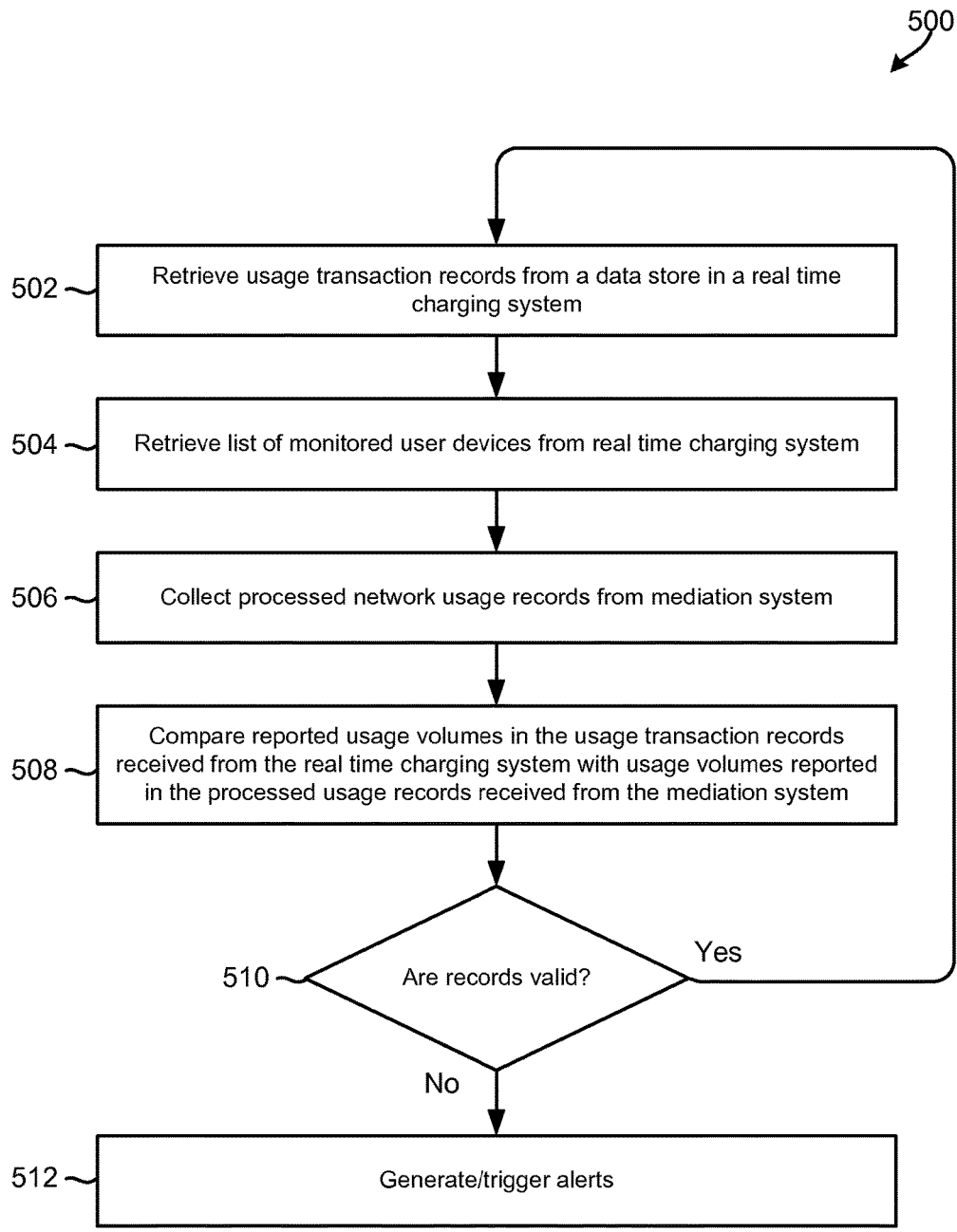
FIG. 5 is a process flow diagram illustrating an embodiment method of preventing revenue leakage in a telecommunications network that supports real-time charging.

FIG. 5 illustrates an embodiment method 500 for preventing revenue leakage that may be implemented in a real-time or near real-time revenue assurance revenue assurance system, such as the system 400 illustrated in FIG. 4. Method 500 may be performed by a processing core in a computing system (e.g., server computing device, etc.) that implements or includes all or portions of the revenue assurance component 144.

In block 502, the processing core may retrieve usage transaction records from a data store (e.g., a database system or memory) of the real-time charging system component 138. The usage transaction records may be PCRF-reported usage data that was stored by the balance management component 424 of the real-time charging system component 138. In block 504, the processing core may retrieve a list of user devices (which may be identified using, for example, their MSISDNs), and associated balance update history, that are being monitored by the balance management component 424. The balance management component will have usage records for these user devices, and the user device identities may be used by the processing core to correlate usage records across multiple sessions.

In block 506, the processing core may retrieve network usage records from the mediation system component 140. In block 508, the processing core may perform revenue assurance operations and/or compare the usage records retrieved from the balance management component 424 with usage records retrieved from the mediation system component 140 to validate the usage records. In determination block 510, the processing core may determine whether the usage records are valid by detecting missing usage records or discrepancies in reported usage volumes due to default quota grants or network connectivity issues. If the processing core determines the usage records are valid (i.e., determination block 510="Yes"), the processing core may repeat the operations of blocks 502-510 as needed, such as when additional records are received.

If the processing core determines that the usage records are not valid (i.e., determination block 510="No"), in block 512, the processing core may generate/trigger alerts. The alerts may be generated to include information suitable for identifying and responding to the problematic usage records (e.g., identification numbers and timestamps of missing usage records) and/or for resending the usage records. These alerts may be generated for presentation to a human (e.g., a system administrator) and/or to cause another component the telecommunication network or in an external system (e.g., a partner's or other third-party's network domain) to perform various operations to mitigate or correct the discrepancies or problems. For example, information about usage volume discrepancies may be sent to the balance management component 424, which may update its stored balance information to correct the discrepancy in response to receiving this information.

For example, in block 512, the processing core may generate an alert message that includes information suitable for causing a network component to resend usage records associated with an identified discrepancy or problematic usage record. This may be accomplished by generating the alert message that includes information suitable for causing a first server (e.g., a server that includes or implements all or portions of the charging gateway function component 210) to resend the usage records associated with the discrepancies to a second server (e.g., a server that includes or implements all or portions of the real-time charging system component 138 or the mediation system component 140) that resends the usage records to the processing core.

In various embodiments, in block 512, the processing core may generate the alert message to also include charging details, corrected charging information, financial information identifying a revenue loss associated with an identified discrepancy or problematic usage record, a subscriber associated with (or responsible for) the revenue loss, a group of subscribers associated with (or responsible for) the revenue loss and/or a component associated with (or responsible for) the revenue loss. The processing core may also generate the alert message to include information identifying the discrepancies or the usage records associated with the identified discrepancies. In an embodiment, the processing core may generate the alert message to include information suitable for causing another component (e.g., a charging system component) to apply correct usage charges based on the identified discrepancies in the reported service usage.

In various embodiments, the revenue assurance component 144 may be configured to use either or both of a ReportID and a ChargingID provided in the usage transaction record as an identifier. The ReportID is an identity in usage records generated by the network elements 202-206 that uniquely identifies the reported usage transactions from a policy and charging rules function component 208 for a given session. The ChargingID is an identity in usage records generated by the gateway that uniquely identifies a session serviced from a specific gateway. This identity is also useful in identifying unique sessions over the Sy reference point and/or interface 414. Both these parameters enable the revenue assurance component 144 to accomplish session level correlation of usage records between the network elements 202-206 and the interface 414 of the real-time charging system component 138.

In various embodiments, the revenue assurance component 144 may be configured to identify usage records and transactions that may have been dropped at the network domain to mediation system interface. These usage records may originate from various network data plane components such as P-GWs, GGSNs, SGSNs, AAA Servers, CMTSes, SMTSes, Content Servers or Broadband Network Gateways. Missing records may be detected using various analysis techniques, including gap checks, sequence checks, etc. Further, the revenue assurance component 144 may be configured so as to not require that the usage records be tracked and monitored at intermediate components within the network (e.g., a charging gateway).

In various embodiments, the revenue assurance component 144 may be configured to identify missing real-time usage that would be reported over, for example, an Sy, or an Sy-like, usage protocol (e.g., due to default quota issues, connectivity issues, etc.).

In various embodiments, the revenue assurance component 144 may be configured to perform either, or both, of user device level and session level usage reconciliation for data between the network-to-mediation interfaces and the real-time charging systems interfaces.

In various embodiments, the revenue assurance component 144 may be configured to generate reports and alerts describing potential revenue leakage. These reports and alerts may be segmented by node, data center, market, etc.

In various embodiments, the revenue assurance component 144 may be configured to identify source nodes and timestamps of usage records responsible for potential revenue leakage. In an enhanced embodiment, the revenue assurance component 144 may be configured to recover missing network usage records using the network domain's charging gateway function data repository.

In various embodiments, the revenue assurance component 144 may be configured to build recovery rules for real-time usage. Such recovery rules may be based upon recovering delta usage from usage records collected from the mediation system. The revenue assurance component 144 may provide an enhanced correlation between the real-time charging usage reports and the mediation records using any unique correlation keys, such as the ReportID and the P-GW IP address. The revenue assurance component 144 may include usage information from other network elements to support reconciliation of usage generated by roaming users. The revenue assurance component 144 may allow the network operator to configure the durations of both the sliding window to reduce false alarms and the storage duration for usage records that require further investigation.

The various embodiments may include components configured to store historical information on usage record processing results which may then be used for higher level reporting and analytics. For example, historical information on usage discrepancies may be used in conjunction with other operator data, such as network maintenance windows, to identify whether discrepancies and errors increase after maintenance activities are conducted. This information may also be used to identify areas in which usage discrepancies are a recurring problem, such as specific categories of user devices or content partners or certain network data centers, Radio Access Network locations, roaming partners, etc.

Figure 6:
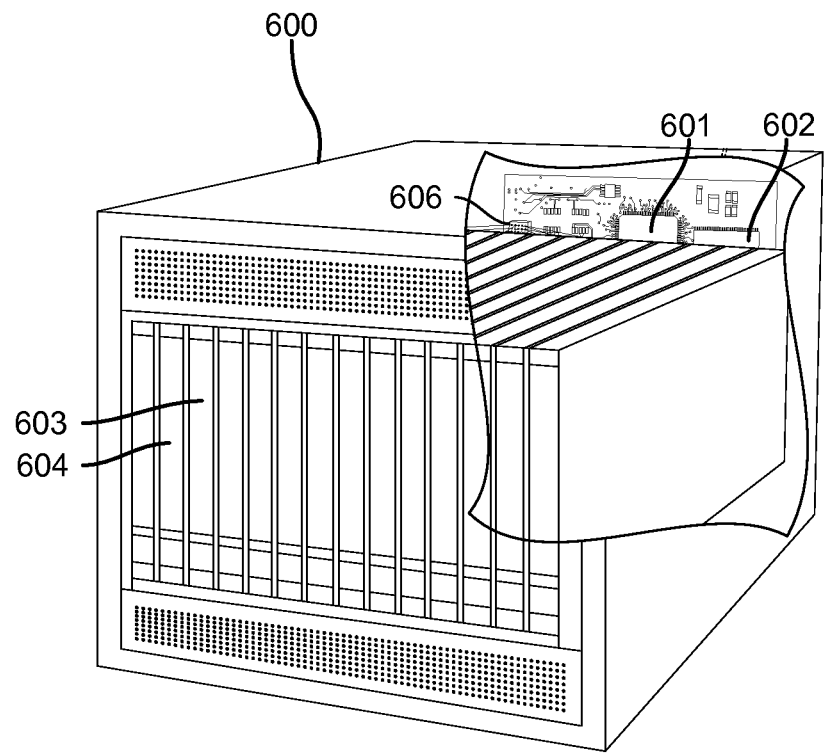
FIG. 6 is a system block diagram of a server suitable for implementing various embodiments.

Various embodiments may be implemented on any of a variety of commercially available server devices, such as the server 600 illustrated in FIG. 6. Such a server 600 typically includes a processor 601 or processor cores coupled to volatile memory 602 and a large capacity nonvolatile memory, such as a disk drive 603. The server 600 may also include a floppy disc drive, compact disc (CD) or DVD disc drive 604 coupled to the processor 601. The server 600 may also include network access ports 606 coupled to the processor 601 for establishing data connections with a network, such as a local area network coupled to other operator network computers and servers.

The processor 601 may be any programmable microprocessor, microcomputer or multiple processor chip or chips that can be configured by processor-executable software instructions to perform a variety of functions, including the functions and operations of the various embodiment methods described above. Multiple processors 601 or processor cores may be provided, such as one processor dedicated to managing network communication functions and one processor dedicated to performing the embodiment methods described above. Typically, processor-executable software applications may be stored in the internal memory 602, 603 before they are accessed and loaded into the processor 601. The processor 601 may include internal memory sufficient to store the application software instructions.

The foregoing method descriptions and the process flow diagrams are provided merely as illustrative examples and are not intended to require or imply that the blocks of the various aspects must be performed in the order presented. As will be appreciated by one of skill in the art the order of steps in the foregoing aspects may be performed in any order. Words such as "thereafter," "then," "next," etc. are not intended to limit the order of the blocks these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. Alternatively, some steps or methods may be performed by circuitry that is specific to a given function.

The functions of the various embodiment methods may be implemented in hardware, software, firmware, or any combination thereof. If implemented in software, processor-executable instructions or code for performing the functions may be stored on a non-transitory computer-readable medium or non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A server method of ensuring integrity of usage data generated within a telecommunication network, comprising:
receiving, in a processor of an assurance server computing device deployed within the telecommunication network, usage information from a network domain and a real-time charging system in the telecommunication network, wherein the network domain and the real-time charging system are connected via at least one communication interface, and wherein the received usage information includes:
network usage records reporting data consumption levels for at least one service, wherein the network usage records are generated by a packet data network gateway (P-GW) component in the network domain, and wherein the at least one service includes one or more of real-time voice, real-time data, real-time messaging, and real-time content delivery;
a list of user devices and associated balance update histories that are being monitored by the real-time charging system; and
usage transaction records stored by the real-time charging system for each monitored user device, wherein the usage transaction records are based on data reported by a policy control rules function (PCRF) component in the network domain;
performing, via the processor, assurance operations to determine whether the received usage information indicates that there are discrepancies in reports of service usage; and
generating, via the processor, an alert message that includes information suitable for causing the network domain to resend network usage records associated with identified discrepancies in response to determining that there are discrepancies in the reports of service usage.

2. The method of claim 1, wherein receiving usage information from the network domain and the real-time charging system in the telecommunication network comprises:
receiving a first network usage record from a first server associated with a shared account balance; and
receiving a second usage transaction record from a second server associated with the shared account balance,
wherein the first network usage record and the second usage transaction record relate to a session associated with a user of the shared account balance.

3. The method of claim 1, wherein receiving usage information from the network domain comprises:
receiving two or more of the network usage records from a mediation system server.

4. The method of claim 1, wherein receiving usage information from the network domain and the real-time charging system in the telecommunication network comprises:
receiving a first network usage record from a mediation system server; and
receiving a second usage transaction record from a balance update history of a real-time charging system server.

5. The method of claim 1, wherein performing assurance operations to determine whether the received usage information indicates that there are discrepancies in reports of service usage comprises performing time-gap analysis operations.

6. The method of claim 1, wherein performing assurance operations to determine whether the received usage information indicates that there are discrepancies in reports of service usage comprises performing statistical count analysis operations.

7. The method of claim 1, wherein performing assurance operations to determine whether the received usage information indicates that there are discrepancies in reports of service usage comprises:
performing audit trail tracking operations that include linking an identifier of a record in the received usage information to an identifier of a summary record.

8. The method of claim 1, wherein performing assurance operations to determine whether the received usage information that there are discrepancies in reports of service usage comprises:
performing audit trail tracking operations that include linking an identifier of a child record in the received usage information to an identifier of its parent record.

9. The method of claim 1, wherein performing assurance operations to determine whether the received usage information indicates that there are discrepancies in reports of service usage comprises:
determining whether the received usage information indicates that there are missing network usage records; and
determining whether the received usage information indicates that there are incomplete network usage records.

10. The method of claim 1, wherein:
receiving network usage records from the network domain comprises:
receiving a first network usage record that includes information identifying service usage in a first unit of measurement; and
receiving a second network usage record that includes information identifying service usage in a second unit of measurement, and
performing assurance operations to determine whether the received usage information indicates that there are discrepancies in reports of service usage comprises:
converting the information identifying service usage in the first unit of measurement into converted unit information; and
comparing the converted unit information to the information included in the second network usage record to determine whether there are discrepancies in the reports of service usage.

11. The method of claim 1, wherein:
receiving usage information from the network domain comprises:
receiving a first network usage record that includes information identifying a first service; and
receiving a second network usage record that includes information identifying a second service, and
performing assurance operations to determine whether the received usage information indicates that there are discrepancies in reports of service usage comprises:
determining whether the first network usage record and the second network usage record relate to delivery of the same service.

12. The method of claim 1, wherein:
generating the alert message that includes information suitable for causing the network domain to resend network usage records associated with the identified discrepancies comprises generating the alert message to include information suitable for causing a first server to resend the usage records associated with the identified discrepancies to a second server, and the method further comprises:
- sending the alert message to the first server; and
- receiving the network usage records associated with the identified discrepancies from the second server in response to sending the alert message to the first server.

13. The method of claim 1, wherein generating the alert message that includes information suitable for causing the network domain to resend network usage records associated with the identified discrepancies comprises generating the alert message to include information identifying one or more of:
- a revenue loss;
- a subscriber associated with the revenue loss;
- a group of subscribers associated with the revenue loss; and
- a component associated with the revenue loss.

14. The method of claim 1, wherein generating the alert message that includes information suitable for causing the network domain to resend network usage records associated with the identified discrepancies comprises generating the alert message to include one or more of:
- information identifying the network usage records associated with the discrepancies;
- information identifying the discrepancies; and
- information suitable for causing a receiving server to apply correct usage charges for the identified discrepancies in reports of service usage.

15. An assurance server computing device deployed within a telecommunication network, comprising:
- a processor configured with processor-executable instructions to perform operations comprising:
  - receiving usage information from a network domain and a real-time charging system in a telecommunication network, wherein the network domain and the real-time charging system are connected via at least one communication interface, and wherein the received usage information includes:
    - network usage records reporting data consumption levels for at least one service, wherein the network usage records are generated by a packet data network gateway (P-GW) component in the network domain, and wherein the at least one service includes one or more of real-time voice, real-time data, real-time messaging, and real-time content delivery;
    - a list of user devices and associated balance update histories that are being monitored by the real-time charging system; and
    - usage transaction records stored by the real-time charging system for each monitored user device, wherein the usage transaction records are based on data reported by a policy control rules function (PCRF) component in the network domain;
  - performing assurance operations to determine whether the received usage information indicates that there are discrepancies in reports of service usage; and
  - generating an alert message that includes information suitable for causing the network domain to resend network usage records associated with identified discrepancies in response to determining that there are discrepancies in the reports of service usage.

16. The assurance server computing device of claim 15, wherein:
- the processor is configured with processor-executable instructions to perform operations such that generating the alert message that includes information suitable for causing the network domain to resend network usage records associated with the identified discrepancies comprises generating the alert message to include information suitable for causing a first server to send the usage records associated with the identified discrepancies to a second server, and
- the processor is configured with processor-executable instructions to perform operations further comprising:
  - sending the alert message to the first server in the telecommunication network; and
  - receiving the network usage records associated with the identified discrepancies from the second in response to sending the alert message to the first server.

17. The assurance server computing device of claim 15, wherein the processor is configured with processor-executable instructions to perform operations such that performing assurance operations to determine whether the received usage information indicates that there are discrepancies in reports of service usage comprises performing statistical count analysis operations.

18. The assurance server computing device of claim 15, wherein the processor is configured with processor-executable instructions to perform operations such that performing revenue assurance operations to determine whether the received usage information indicates that there are discrepancies in reports of service usage comprises performing audit trail tracking operations that include linking an identifier of a child record in the received usage information to an identifier of its parent record.

19. The assurance server computing device of claim 15, wherein the processor is configured with processor-executable instructions to perform operations such that performing assurance operations to determine whether the received usage information indicates that there are discrepancies in reports of service usage comprises:
- determining whether the received usage information indicates that there are missing or incomplete network usage records.

20. The method of claim 1, further comprising:
- monitoring, via the processor, an audit feed via an SS7 probe of a control link on a plurality of SS7 interconnect links; and
- verifying, via the processor, interconnect traffic volumes into interconnect switches based on a result of the monitoring.

* * * * *